Patented Aug. 18, 1925.

1,550,358

UNITED STATES PATENT OFFICE.

HERMAN HEUSER, OF EVANSTON, ILLINOIS.

MANUFACTURE OF BUTTER.

No Drawing.   Application filed March 9, 1923.   Serial No. 624,028.

*To all whom it may concern:*

Be it known that I, HERMAN HEUSER, a citizen of the United States, residing at Evanston, in the county of Cook and State of Illinois, have invented new and useful Improvements in the Manufacture of Butter, of which the following is a specification.

The present invention relates to improvements in the art of manufacturing butter, and more particularly to improvements in the processes of its preparation which will enable it to be preserved for long periods of time, even at atmospheric temperatures, without spoiling or development of rancidity. It will be fully understood from the following description.

Butter, as ordinarily made has incorporated within it substantial amounts of air as a result of the essential steps of churning and working performed during its manufacture. The oxygen thus incorporated in the butter by mechanical action together with that actually dissolved in the butter substance itself, is an essential factor in the development of bacterial growths, both aerobic and anaerobic, and likewise plays an important rôle in the chemical changes resulting in rancidity and other changes in taste and flavor of the butter. In carrying out my process, I materially reduce the possibilities of bacterial growth and of spoiling by chemical action by the substantial removal of the oxygen present in the butter. I prefer also to accompany the removal of oxygen with a pasteurization or sterilization of the butter, the heat of pasteurization or sterilization materially aiding in the deoxygenating of the butter and at the same time eliminating to a large extent the sources of bacterial change.

In carrying out the present invention, the butter is prepared for storage by incorporating in it during its manufacture a sufficient quantity of a suitable non-toxic deoxygenating agent, preferably a phosphite compound, enclosing the butter in a substantially hermetically sealed container, and subjecting it while in the container to an elevated temperature, at least within the pasteurizing range. The deoxygenating agent which I preferably employ are phosphite compounds, such as phosphorous, hypophosphorous or pyrophosphorous acid or soluble salts thereof, such as their alkaline metal salts.

In carrying out the invention butter is churned from cream in the customary manner. The churned butter is removed, worked and washed in the usual manner for the removal of mechanically held butter-milk, and during the latter stages of its working, there is incorporated in it a suitable proportion of table salt (if the butter is to be salted) and with it a proportion of a deoxygenating compound, for example, a phosphite such as sodium hypophosphite. The proportion of deoxygenating compound employed is determined by the average proportion of oxygen held in butter together with the unfilled space that will be left in the containers in which the butter is packed. As will hereinafter be pointed out, the proportion of vacant space in these containers is preferably only slightly in excess of the space necessary for the expansion of the butter during its heat treatment for pasteurization or sterilization. Ordinarily I find that from one-thirtieth to one-sixth ounce of sodium hypophosphite is sufficient for each pound of butter. The amount of salt normally contained in butter varies from one-sixth to five-eighths ounce per pound of butter. The hypophosphite has an exceedingly mild saline taste, so it may be employed in the preparation of unsalted butter.

After the deoxygenating agent and the salt (if the latter be employed) are thoroughly worked into the butter, the latter is formed into prints in the usual manner, the prints being preferably shaped to conform with the shape and size of the containers to be employed in the subsequent treatment and storage of the butter. As containers, I preferably employ metal cans, constructed so that they may be tightly closed and substantially hermetically sealed after the butter has been placed therein. Glass, earthenware or other containers may also be employed, but I have found metal containers or cans to be preferable by reason of their greater heat conductivity and the resulting decreased length of time required for heating and cooling the material.

The butter prints are placed in the metallic containers or cans, which are of a size such as to provide room for the expansion of the butter during heating. The expansion of butter in heating it from 20° C. to 100° C. is approximately 6% and some additional space is provided for entrapped air that is forced out during the heating.

The containers or cans, after insertion of the butter, are substantially hermetically closed. In the case of cans, this closure may suitably be effected by any suitable steaming and soldering mechanism, preferably by the so-called "double seaming machine" in order to insure as tight a seal as possible. The butter is then heated, enclosed in the containers, to a temperature of at least 145° F. for its pasteurization or sterilization. It may suitably be heated, for example, to 155° F. and maintained at this temperature for about 20 minutes. As the butter is liquefied at this temperature, it is preferred that the container and the butter be thoroughly agitated by any suitable shaking device during the period of application of heat and during subsequent cooling. This agitation aids in the distribution of heat, maintains the uniformity of composition of the butter throughout, greatly facilitates the deoxygenating action and insures a product of uniform composition after cooling. After the butter has been pasteurized or sterilized, the effectiveness of the elevated temperature being greatly increased by the presence of the deoxygenating agent, the butter is cooled while continuing the shaking, the cooling being suitably effected, for example, by showering cold water on the containers while they are being agitated. After the butter has been cooled below its congealing temperature (about 90° F.) it may be stored at ordinary atmospheric temperature without the development of bacterial or chemical change. By suitable control of the temperature during pasteurization, that is by maintaining a temperature of between 145 and 162° F. for periods not in excess of 30 minutes, the full vitamin content of the butter may be maintained. The phosphites are non-toxic, being less irritant than the table salt normally present in the butter, and the products of the deoxygenating reaction, which are phosphatic compounds, play a beneficent rôle in nutrition.

Although the present invention has been described in connection with the specific details of a method of turning it into effect, it is not intended that these details shall be regarded as limitations upon the scope of the invention, except in so far as included in the accompanying claims.

I claim:

1. The improvement in the art of manufacturing butter which consists in incorporating therein a non-toxic deoxygenating agent.

2. The improvement in the method of manufacturing butter which consists in incorporating therein a non-toxic deoxygenating agent and subsequently subjecting the butter to at least a pasteurizing temperature.

3. The improvement in the method of manufacturing butter which consists in incorporating therein a non-toxic deoxygenating agent, enclosing the butter in a substantially hermetically sealed container, and heating the enclosed butter to at least pasteurizing temperature.

4. The improvement in the method of manufacturing butter which consists in incorporating a phosphite compound in the butter.

5. The improvement in the method of manufacturing butter which consists in incorporating therein sodium hypophosphite.

6. The improvement in the method of manufacturing butter which consists in incorporating therein sodium hypophosphite and heating the butter to at least 145° F.

7. The improvement in the method of manufacturing butter which consists in incorporating therein sodium hypophosphite, enclosing the butter in a substantially hermetically sealed container, and heating the enclosed butter to at least 145° F.

8. The improvement in the method of manufacturing butter which consists in incorporating therein a non-toxic deoxygenating compound, enclosing the butter in a substantially hermetically sealed container, heating the butter to at least pasteurizing temperature and subsequently cooling the butter, and agitating the butter within the container during the periods of heating and cooling.

9. The improvement in the art of manufacturing butter which consists in incorporating in butter from one-thirtieth to one-sixth ounce of sodium hypophosphite to each pound of butter, enclosing the butter in a substantially hermetically sealed container, heating the butter to 155° F. for approximately 30 minutes, cooling the butter and agitating the butter in the container during the periods of heating and cooling.

10. A substantially oxygen-free butter containing the phosphatic products of reaction of the oxygen of the butter on phosphites.

HERMAN HEUSER.